United States Patent

Salenbauch et al.

Patent Number: 6,032,587
Date of Patent: Mar. 7, 2000

[54] FOLDING TABLE

[75] Inventors: Hermann Juergen Salenbauch, Geretsried; Alexander Klatt, Munich, both of Germany; Robert Stancel, Los Altos Hills; Grace Tseng, Palo Alto, both of Calif.

[73] Assignee: Bayerische Motoren Werke Aktiengesellschaft, Munich, Germany

[21] Appl. No.: 09/160,752

[22] Filed: Sep. 25, 1998

[51] Int. Cl.$^7$ .................................................. A47B 23/00
[52] U.S. Cl. .............................................................. 108/44
[58] Field of Search ........................... 108/44, 45, 115, 108/90, 93, 99; 297/188.15, 188.17, 188.19, 145; 16/232, 367, DIG. 23, 242; 220/333

[56] References Cited

U.S. PATENT DOCUMENTS

| | | | |
|---|---|---|---|
| 2,597,330 | 5/1952 | Huddleston | 108/45 |
| 2,719,066 | 9/1955 | Budzinski . | |
| 5,316,368 | 5/1994 | Arbisi | 297/188.19 |
| 5,370,060 | 12/1994 | Wang | 108/44 |
| 5,372,403 | 12/1994 | Puerto | 297/188.17 |
| 5,375,805 | 12/1994 | Sudak et al. | 297/188.17 X |
| 5,492,068 | 2/1996 | McKee | 108/44 |
| 5,516,191 | 5/1996 | McKee | 297/188.15 |
| 5,620,228 | 4/1997 | Ito et al. | 297/188.17 |
| 5,647,652 | 7/1997 | Zalewski et al. | 108/44 X |

FOREIGN PATENT DOCUMENTS

| | | |
|---|---|---|
| AS1243842 | 11/1966 | Germany . |
| 4237855C1 | 4/1994 | Germany . |
| 43 06 706 A1 | 9/1994 | Germany . |
| 296 03 294 U1 | 6/1996 | Germany . |

OTHER PUBLICATIONS

German Search Report, May 26, 1999.

*Primary Examiner*—Jose V. Chen
*Attorney, Agent, or Firm*—Evenson McKeown Edwards & Lenahan, PLLC

[57] ABSTRACT

A table that can be pulled out is located on the underside of a pivotable armrest on a center console of a motor vehicle. The table consists of a base panel as well as a pivot panel. The pivot panel can be pivoted by a bearing mechanism which can be raised either toward the driver side (arrow 17) or toward the passenger side (arrow 18).

36 Claims, 3 Drawing Sheets

FOLDING TABLE

BACKGROUND AND SUMMARY OF THE INVENTION

The invention relates to a folding table for a motor vehicle, with a first and a second panel part, with the two panel parts being rectangular in shape and located one above the other and connected with one another by at least one folding joint in a manner that the second panel part can be pivoted next to the first panel part to enlarge the table area.

German patent document DE 42 37 855 C1 discloses a folding table. This table consists of two panel parts that are articulated with respect to one another. Here, the parts are pivotable from a starting position in which the panel parts are located one on top of the other into an operating position where the panel parts are located side by side. The two panel parts can also be brought into a vertical position in their folded state and lowered in the manner of a cassette into a receiving shaft.

An object of the present invention is to increase the functionality of the aforementioned folding table and to allow its use by both the driver and the passenger of a motor vehicle. Another object is to provide a simply designed combination of the folding table with a storage compartment.

These and other objects and advantages are achieved by the folding table according to the present invention, in which a first panel part is used as the "base panel", where the second panel part is capable of being pivoted as an "expansion part" to both sides of the base panel. As a result, use of the table by both the driver and passenger of a motor vehicle is made possible in a simple manner, thus avoiding an unnecessarily cumbersome large design of the table.

Various embodiments of the table according to the invention are contemplated. For reasons of clarity, embodiments with two panel parts are discussed here. However, in other similarly contemplated embodiments according to the invention, the table can also consist of more than two panel parts.

In an embodiment of the table according to the invention, the table is connected to the underside of a lid for a storage compartment. This combination of table and lid eliminates the need for a special storage space for the table. The connection to the lid can also be broken. As a result of the releasable connection between the table and the lid, the table (when not in use) can be pivoted together with the lid. Alternatively, after separation from the lid, the table can be transferred to its operating position. This results in an improved utilization of space, which is of considerable advantage in motor vehicles, especially in the center console area.

According to an exemplary embodiment of the present invention, the locking of the table to the lid is accomplished via a latch mechanism. Similarly the table, after being disconnected from the lid, can likewise be secured by a latch mechanism (or the like) to the storage compartment.

In preferred embodiments of the table according to the invention, the table allows access to the storage compartment even when it is in its operating position.

In exemplary embodiments of the table according to the invention, the table can be displaced by telescoping rails.

In especially advantageous embodiments of the table, the lid can be designed as an armrest (for example, as the center armrest for a motor vehicle) with a storage compartment located beneath and accessible by pivoting the lid. In addition, the table can be accommodated in a recess of an instrument panel, a seat, a door, etc.

In preferred embodiments of the table according to the invention, the functionality of the table is further increased by utilizing a rotatable mount for the table.

Other objects, advantages and novel features of the present invention will become apparent from the following detailed description of the invention when considered in conjunction with the accompanying drawings.

DETAILED DESCRIPTION OF THE DRAWINGS

Figure 1:
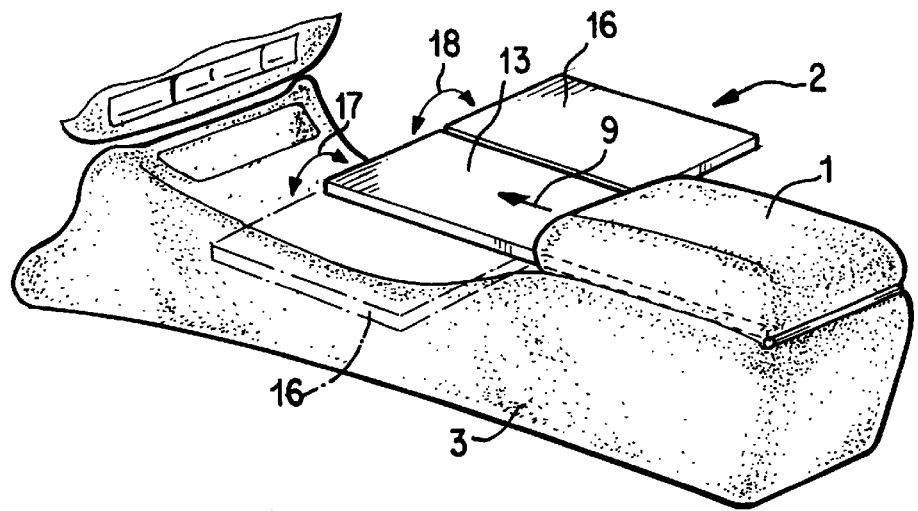
FIG. 1 shows the vicinity of a center console of a motor vehicle with a center armrest as well as a table according to the invention in the unfolded position, shown in a perspective view.

FIG. 1 shows a center console 3 of a motor vehicle, with an armrest 1 in its rear end area. Below armrest 1, a table designated in its totality by 2 is accommodated this table can be pulled out in the direction of arrow 9 from the area beneath armrest 1. Table 2 consists of a first panel part 13 which is designed as a base panel, as well as a second panel part 16 (pivot plate) which is provided to increase the table area. Pivot plate 16, as will be described in greater detail below, is connected to base panel 3 in a manner such that table 2 can be expanded in the direction of the driver or the passenger (in accordance with arrows 17 and 18).

Figure 2:
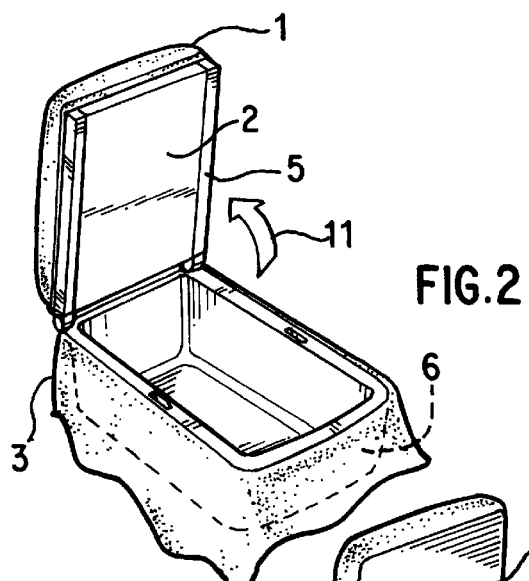
FIG. 2 is a perspective view of the subject of FIG. 1 from the opposite direction, with the table in its non-use position.
Figure 3:
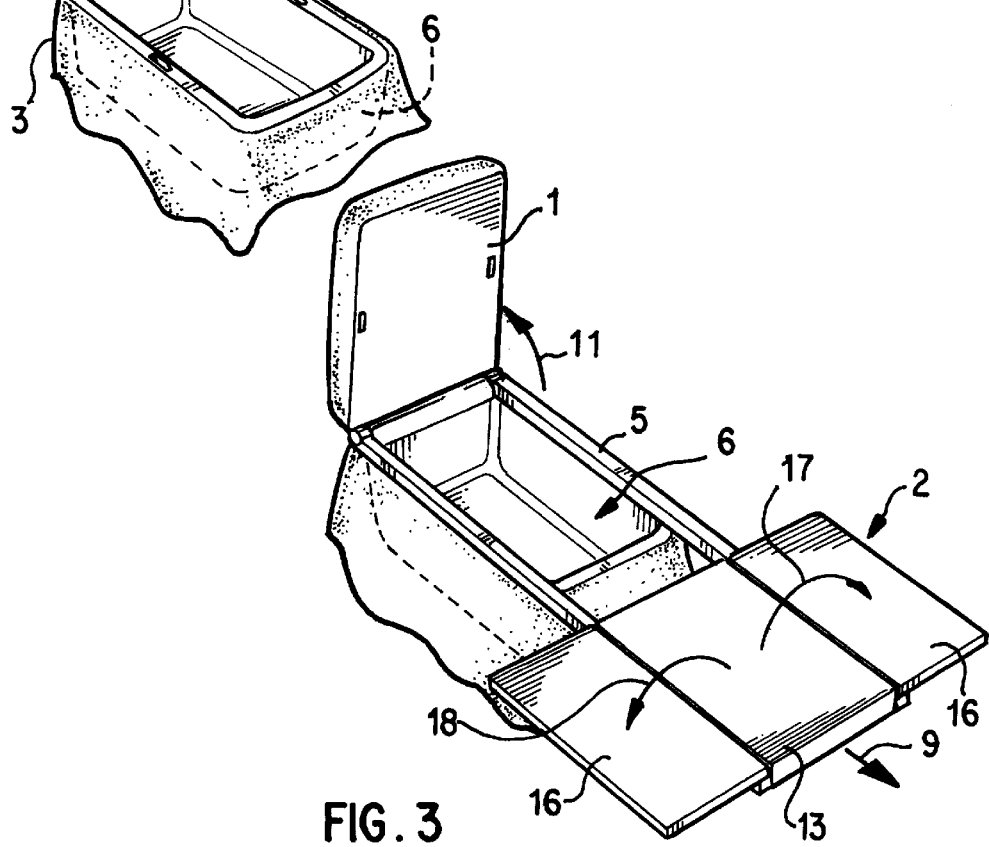
FIG. 3 is a view corresponding to FIG. 2 with the table unfolded.

As can be seen from FIGS. 2 and 3, a storage compartment 6 is located beneath armrest 1. The compartment 6 is accessible by pivoting (arrow 11) armrest 1 which is designed as a lid. Table 2, after armrest 1 has been pivoted, can be pulled out on a guide rail 2 in order to allow unimpeded access to storage compartment 6. A mechanism shown in detail in FIG. 5 connects extended table 2 with center console 3, while folded table 2 is connected to the underside of armrest 1.

Figure 4:
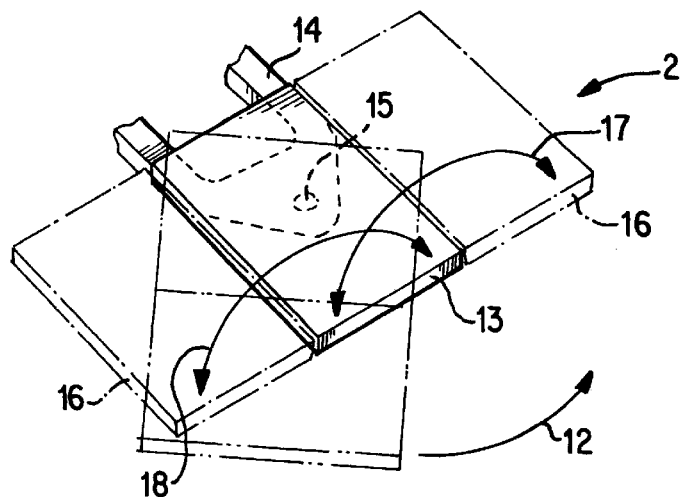
FIG. 4 is a schematic diagram of the table in FIG. 3, with a rotatable mount.

By an additional intermediate panel 14 with a pivot joint 15, an expanded functionality of table 2 is obtained (FIG. 4). This provides the ability to rotate table 2 (as indicated by arrow 12) around an axis which is perpendicular to the extraction direction of intermediate panel 14. In a manner already described, pivot panel 16 can be pivoted either (according to arrow 17) toward the driver's side or (according to arrow 18) toward the passenger side.

FIGS. 5a, 5b and 5c, 5d each show a device for the alternate locking of table 2 to armrest 1 or center console 3.

Figure 5A:
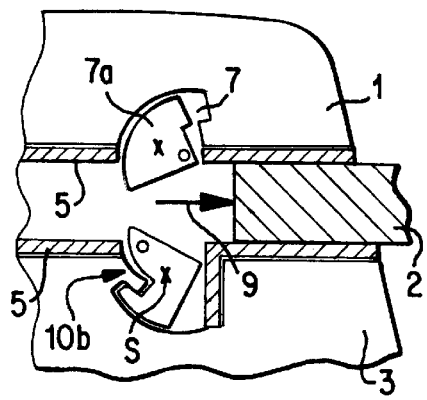
FIGS. 5a, 5b, 5c, 5d are enlarged sections of a device for connecting the table and armrest.

According to FIG. 5a, recesses 7 and 10 (in armrest 1 or center console 3) receive an upper or a lower latch 7a to 10a rotatably mounted outside their pivot points S. When table 2 is pushed into the area below armrest 1 (arrow 4, right side of FIG. 5a), both latches 7a and 10a are located in recesses 7 and 10. At this time, latch 7a grips behind an undercut 7b in armrest 1, producing a form corresponding connection behind armrest 1 and table 2 secured in guide rail 5. With table 2 pulled out, on the other hand (arrow 9, left side of FIG. 5a), latch 7a comes out of undercut 7b and thus breaks the form corresponding connection with armrest 1 (left part of FIG. 5a). At the same time, however, lower latch 10a moves so that it engages an undercut 10b in center console 3, whereupon coupling of track 5 (and hence table 2) to center console 3 takes place. When table 2 is pushed inward in the direction of arrow 4, this locking action is released once more and table 2 is again coupled to armrest 1.

Figure 5B:
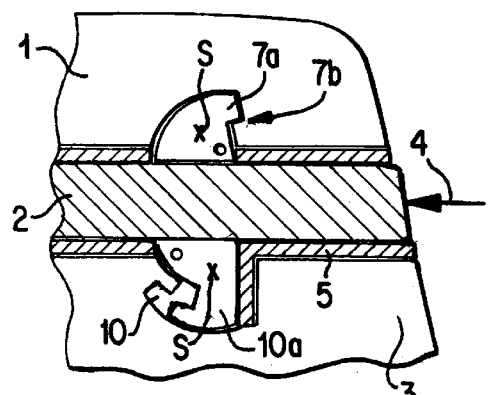
Figure 5C:
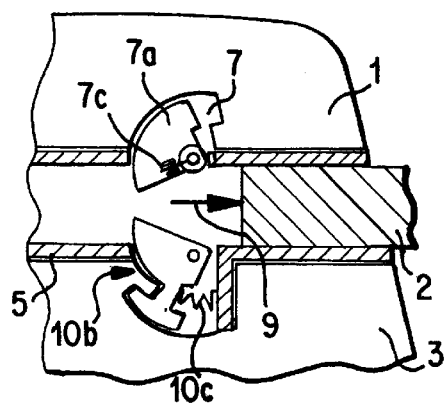
Figure 5D:
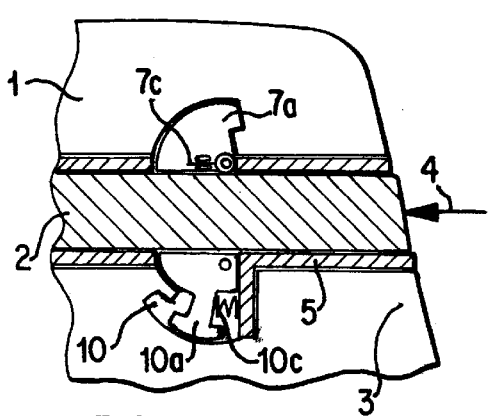

FIG. 5b shows a variation on the device in FIG. 5a in which latches 7a and 10a are displaced by spring force. Thus, on the one hand, the displacement of latch 7a is reinforced by a torsion spring 7c. On the other hand, a coil spring 10c causes pawl 10b to rotate against its own weight and thus (with table 2 pulled out) to couple track 5 to center console 3.

Figure 6:
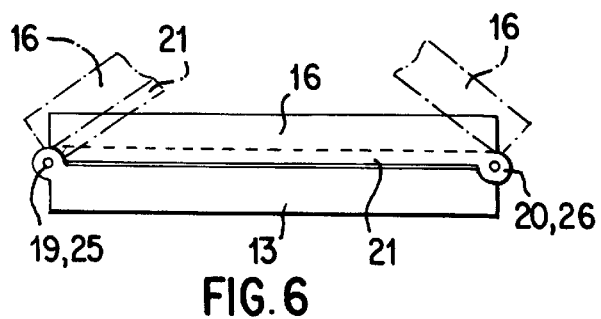
FIGS. 6 to 9 are views of the table in various positions.
Figure 7:
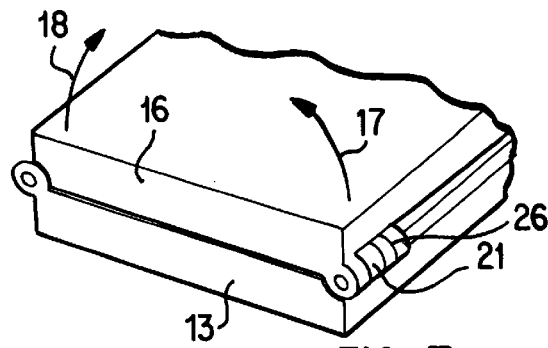
Figure 8:
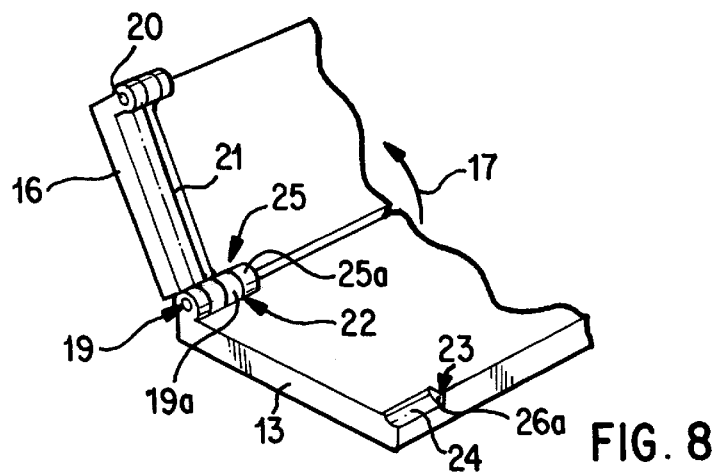
Figure 9:
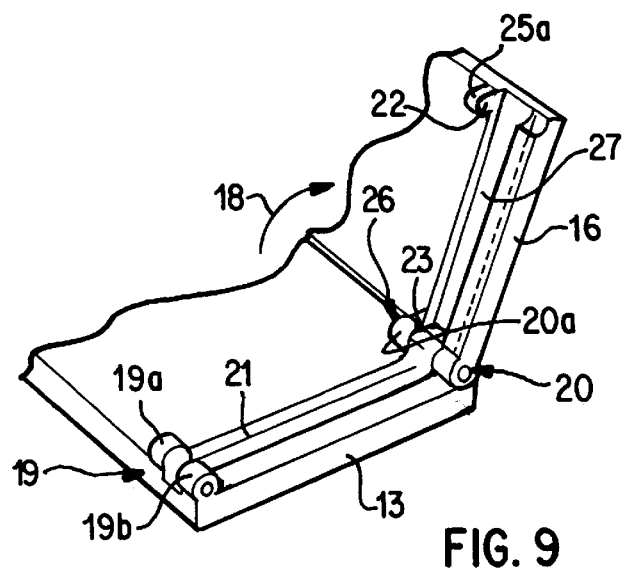

FIGS. 6 thru 9 show in detail how a pivot panel 16 can be folded to either side of base panel 13. For this purpose, two coupling rods 21 are provided, of which only one coupling rod 21 is shown in the cutouts of FIGS. 6 and 9. Between base panel 13 and pivot panel 16, a folding joint 25 is provided on the driver's side. This folding joint 25 is located in the module with a first coupling joint 19 that connects a coupling rod 21 with base panel 13 in an articulating manner. The other end of coupling rod 21 is articulated by a second coupling joint 20 to pivot panel 16. This coupling joint 20 also forms another joint 26 with base panel 13 (FIG. 9).

When pivot panel 13 is pivoted (according to arrow 17) toward the driver's side, joint 25 is engaged and thus connects pivot panel 16 directly with base panel 13. Joint 25 is then formed by a bearing part 19 on base panel 13 as well as a bearing part 25a on pivot panel 16. The bearing part 25a and pivot panel 16 are connected with one another by a suitably designed form following frictional connection. Similarly, a connection is also possible exclusively via shape or friction. Arrow 22 marks the connecting areas. In the configuration shown in FIG. 8, coupling rod 21 pivots "blindly" with pivot plate 16.

When pivot panel 16 is folded as indicated by arrow 18 toward the passenger side (FIG. 9), the two parts 19a and 25a of bearing 25 disengage. This is accomplished by overcoming the connection 22 between the two bearing parts 19a and 25a. The first coupling joint 19 that is formed by bearing part 19a and bearing part 19b (i.e., connected with a base panel, and cannot be released) then begins to function. At the same time (during this pivotal movement), pivoting pivot panel 16 is articulated by joint 26 to base panel 13, while bearing part 20a of coupling joint 20 and a bearing part 26a are in a form following and/or frictional connection. Bearing part 26a is machined as part of base panel 13 at the edge of a recess 24. Arrow 23 shows the connecting areas of joint 26.

Thus, depending on pivot direction 17 or 18, bearings 25 or 28 can be released or brought together, thus allowing an alternate pivoting of pivot panel 16 relative to base panel 13.

While in the embodiment of FIGS. 6 to 9 coupling rod 21 is sunk into a recess 27 of pivot panel 16, it is also possible to embed coupling rod 21 in base panel 13 exclusively, or to embed it half each in base panel and pivot panel 13 and 16. Coupling rods 21 can also be shaped differently, in contrast to the example shown, and can have an elliptical cross section, for example. Similarly, the two coupling rods 21 can be replaced for example by a single panel-shaped coupling element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A folding table for a motor vehicle, comprising:

a first rectangular panel part; and a second rectangular panel part disposed on top of and pivotally connected to the first rectangular panel part by at least one folding joint to permit movement of the second rectangular panel part with respect to the first rectangular panel part to thereby enlarge an area of the table;

wherein the table is disposed on an underside of a displaceable lid for a storage compartment area and is displaceable laterally outward from the storage compartment via a releasable connection between the table and the displaceable lid.

2. The folding table according to claim 1, wherein the releasable connection comprises a latch, and wherein when the table is positioned on the underside of the lid, the latch engages an undercut of the lid, and when the table is positioned outside lid, the latch emerges from the undercut via at least one of its weight and its spring force.

3. The folding table according to claim 2, wherein a second device forms a releasable connection of the table and storage compartment.

4. The folding table according to claim 2, wherein, following elimination of a connection between table and lid, a displacement means allows a displacement of the table from an area of an access opening of the storage compartment.

5. The folding table according to claim 2, wherein the lid forms an armrest for an occupant of a motor vehicle.

6. The folding table according to claim 1, wherein a second device forms a releasable connection of the table and storage compartment.

7. The folding table according to claim 6, the device further comprising:

a latch;

wherein when the table is positioned outside of the lid, the latch engages an undercut of storage compartment via at least one of its weight and its spring force, and when the table is positioned on an underside of the lid the latch emerges from an undercut of the lid.

8. The folding table according to claim 6, wherein, following elimination of a connection between table and lid, a displacement means allows a displacement of the table from an area of an access opening of the storage compartment.

9. The folding table according to claim 6, wherein the lid forms an armrest for an occupant of a motor vehicle.

10. The folding table according to claim 1, wherein, following elimination of a connection between table and lid, a displacement means allows a displacement of the table from an area of an access opening of the storage compartment.

11. The folding table according to claim 7, wherein the means comprises rails which can be slid into one another.

12. The folding table according to claim 1, wherein the lid forms an armrest for an occupant of a motor vehicle.

13. A folding table arrangement for a motor vehicle, comprising:

a base, a first panel part supported at the base, a second panel part disposed above and pivotably connectable to said first panel part for pivotal movement around a horizontal pivot axis when in a first position, and an assembly facilitating optional pivotal movement of the second panel part from said first position to a second table enlarging position at respective opposite lateral sides of the base.

14. A folding table arrangement according to claim 13, wherein said assembly includes a pivotal connection between the base and the first panel part which accommodates pivotal movement of the first panel part about a vertical pivot axis.

15. A folding table arrangement according to claim 14, wherein said base is formed at least in part by a center console disposed between a passenger side and a driver side of a vehicle.

16. A folding table arrangement according to claim 15, wherein said center console includes a storage compartment having an openable lid member, and wherein said first and second panel parts are movable between a stowage position under the lid member and an operative position horizontally spaced from the lid member.

17. A folding table arrangement according to claim 16, comprising a releasable latching mechanism operable to latch the first and second panel parts in the stowage position, wherein said releasable latching mechanism is operable to latch the first and second panel parts to said lid member.

18. A folding table arrangement according to claim 15, wherein said center console includes a storage compartment having an openable lid member, and wherein said first and second panel parts are movable between a stowage position under the lid member and an operative position horizontally spaced from the lid member.

19. A folding table arrangement according to claim 18, wherein said lid member is operable as an armrest when in a closed position.

20. A folding table arrangement according to claim 18, wherein first and second panel parts are supported on guide rails at the lid member to be movable between stowage and operative positions with said lid member in a closed position.

21. A folding table arrangement according to claim 13, wherein said assembly includes first and second horizontal pivot hinge structures at opposite lateral sides of the first panel part which are selectively engageable with respect to pivot hinge support structures of said second panel part.

22. A folding table arrangement according to claim 21, wherein said base is formed at least in part by a center console disposed between a passenger side and a driver side of a vehicle.

23. A folding table arrangement according to claim 22, wherein said center console includes a storage compartment having an openable lid member, and wherein said first and second panel parts are movable between a stowage position under the lid member and an operative position horizontally spaced from the lid member.

24. A folding table arrangement according to claim 23, comprising a releasable latching mechanism operable to latch the first and second panel parts in the stowage position, wherein said releasable latching mechanism is operable to latch the first and second panel parts to said lid member.

25. A folding table arrangement according to claim 22, wherein said center console includes a storage compartment having an openable lid member, and wherein said first and second panel parts are movable between a stowage position under the lid member and an operative position horizontally spaced from the lid member.

26. A folding table arrangement according to claim 25, wherein said lid member is operable as an armrest when in a closed position.

27. A folding table arrangement according to claim 25, wherein first and second panel parts are supported on guide rails at the lid member to be movable between stowage and operative positions with said lid member in a closed position.

28. A folding table arrangement according to claim 13, wherein said base is formed at least in part by a center console disposed between a passenger side and a driver side of a vehicle.

29. A folding table arrangement according to claim 28, wherein said center console includes a storage compartment having an openable lid member, and wherein said first and second panel parts are movable between a stowage position under the lid member and an operative position horizontally spaced from the lid member.

30. A folding table arrangement according to claim 29, comprising a releasable latching mechanism operable to latch the first and second panel parts in the stowage position.

31. A folding table arrangement according to claim 30, wherein said releasable latching mechanism is operable to latch the first and second panel parts to said lid member.

32. A folding table arrangement according to claim 29, wherein said first and second panel parts are supported on guide rails of the center console for slidable movement between the stowage and operative positions.

33. A folding table arrangement according to claim 32, wherein said guide rails are disposed at an underside of the lid member and are configured to permit movement of the first and second panel parts to the operative position with said lid member in a closed position.

34. A folding table arrangement according to claim 33, wherein said lid member is operable as an armrest when in a closed position.

35. A folding table arrangement according to claim 29, wherein said lid member is operable as an armrest when in a closed position.

36. A folding table arrangement according to claim 13, wherein said first and second panel parts are rectangular in shape.

* * * * *